United States Patent [19]
Kearns

[11] Patent Number: 6,072,535
[45] Date of Patent: Jun. 6, 2000

[54] SIDEBOX DISPLAY CHANNEL LOOP CONTROLLER

[76] Inventor: Donovan E. Kearns, 1601 W. Foxpark Dr. #10K, West Jordan, Utah 84088

[21] Appl. No.: 08/872,626

[22] Filed: Jun. 10, 1997

[51] Int. Cl.[7] .............................. H04N 5/44; H04N 7/00; H04N 5/232
[52] U.S. Cl. ........................ 348/563; 348/906; 348/734; 348/114; 348/211
[58] Field of Search ............................... 348/906, 12, 13, 348/6, 7, 10, 734, 114, 211, 563; 455/3.1, 5.1

[56] References Cited

U.S. PATENT DOCUMENTS

| 5,313,282 | 5/1994 | Hayashi | 348/734 |
| 5,477,275 | 12/1995 | Toyoshima et al. | 348/734 |
| 5,585,865 | 12/1996 | Amano et al. | 348/906 |
| 5,585,866 | 12/1996 | Miller et al. | 348/731 |
| 5,648,824 | 7/1997 | Dunn et al. | 348/734 |
| 5,657,072 | 8/1997 | Aristides et al. | 348/13 |
| 5,784,095 | 7/1998 | Robbins et al. | 348/6 |

*Primary Examiner*—John K. Peng
*Assistant Examiner*—Linus H. Lo
*Attorney, Agent, or Firm*—Lloyd W. Sadler

[57] ABSTRACT

A channel loop controller is disclosed in one embodiment of the present invention as including a processor operably associated with a television, an input device operably connected to the processor, a memory device operably connected to the processor, and an output device operably connected to the processor for displaying output data. The input device may be a keypad incorporated within the television, or it may be a remote control unit. If a remote control unit is used, a loop button and a save button may be included within the remote control unit. Executable code stored in memory and executable by the processor enables the apparatus to, in combination with user input, configure one or more channel lists having channels selected by the user. The save button may be used to save a channel to a channel list. The loop button may be used to increment or decrement to the next channel in a channel list. Additionally, the apparatus provides the user with the ability to assign various graphical symbols to the channel lists, indicative of different types of programming.

2 Claims, 14 Drawing Sheets

SIDEBOX DISPLAY CHANNEL LOOP CONTROLLER

BACKGROUND

1. The Field of the Invention

This invention relates to television systems and, more particularly, to novel Systems and methods for configuring temporary as well as permanent channel lists facilitating easy access to channels contained in the channel lists and facilitating grouping of channels by topic.

2. The Background Art

Before the proliferation of digital technology, televisions used analog components typically including a dial on the television for changing channels. In operation, a user would manually turn the dial in order to advance the channel currently being tuned into the television. With manual dials, a user was required to advance through each channel in the advancement of a channel number. Thus, when unviewable channels were interposed between two viewable channels, a user would have to traverse these channels in order to get from the first viewable channel to the second. With digital technology, many televisions now overcome this disadvantage.

Most televisions having digital technology provide an autoprogramming facility to overcome the problem of requiring a user to navigate through one or more unviewable channels to get to the next viewable channel. A user can autoprogram the television; specifically, the autoprogramming facility scans the channels. As each channel is scanned, those channels containing viewable signals are saved into memory, thereby creating a list of viewable channels. Once created, this standard list of viewable channels may be traversed when a user presses the channel-up button or the channel-down button. Because only the viewable channels were stored, when a user presses the channel-up or channel-down button, the television will advance to the next viewable channel, avoiding the unviewable channels that may exist therebetween.

Even with the autoprogrammed standard list, a user often wades through undesired channels before arriving at the channel the user wants to watch. For example, assume an autoprogramming feature creates a list containing the channels one through ten. If a user is currently watching one and wants to view channel five, the user typically must either (1) use the channel-up button and tune to two, three, four, and then five, or (2) use the channel-down button and tune to ten, nine, eight, seven, six and then five, or (3) use number buttons and press the zero button and then the five button. Requiring a user to navigate through intervening channels is cumbersome. Typically, a user will use the channel-up or channel-down button before resorting to entering the actual channel number on the keypad because using the channel buttons is usually more convenient.

Some facilities were developed by those skilled in the art to somewhat address this problem. One method to enable a user to more quickly get to a channel is to implement a recall method which would recall the last viewed channel at the touch of a button. These devices stored the last viewed channel, and upon a user pressing a recall key, the television would tune to the last viewed channel. This facility made it much easier to get to the last viewed channel. However, this recall method was very limited in that it only provided a user with quick access to the last viewed channel.

Other systems allow access to a channel that is more direct than navigating through the entire list of viewable channels by using extended keypresses. With these systems, a user may store a channel with a key, typically on a remote control. If this key is held down for an extended time (usually several seconds) the television will tune to the previously assigned channel. Despite the added ability to more directly access several channels, this system requires a user to hold a key down for an extended period of time, prolonging the wait to view the desired channel.

BRIEF SUMMARY AND OBJECTS OF THE INVENTION

In view of the foregoing, it is a primary object of the invention to provide the television viewer a means to temporarily store and display as many channels as desired in a graphical manner to the screen, referred to as a sidebox display, whereby the user can easily see what channels are contained therein and easily remove them from the sidebox display without entering a menu. Channels stored in a sidebox display may be accessed thus reducing the time and effort expended by a user in changing the channel being viewed to a desired channel.

Another object of the invention is to provide menu support of channel lists and television settings such as television control options, sidebox edit options, user created channel list options, and password related security options.

Consistent with the foregoing objects, and in accordance with the invention as embodied and broadly described herein, a sidebox channel loop controller is disclosed in one embodiment of the present invention as including a processor operably associated with a television, an input device operably connected to the processor, a memory device operably connected to the processor, and an output device operably connected to the processor for displaying output data. The input device may be a keypad incorporated within the television, or it may be a remote control unit. If a remote control unit is used, a loop button and a save button may be included within the remote control unit.

Executable code stored in memory and executable by the processor enables the apparatus to, in combination with user input, configure one or more channel lists, either temporary or permanent, having channels selected by the user. The save button may be used to save a channel to a channel lists, clear a temporary channel list without having to enter a menu, or enter a menu mode consisting of multiple screens enabling a user to create, modify, load, label, delete, and lock various channels or channel lists. The loop button may be used to increment or decrement to the next channel in a channel list, to make a menu selection, or to erase text in a menu mode.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 17, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
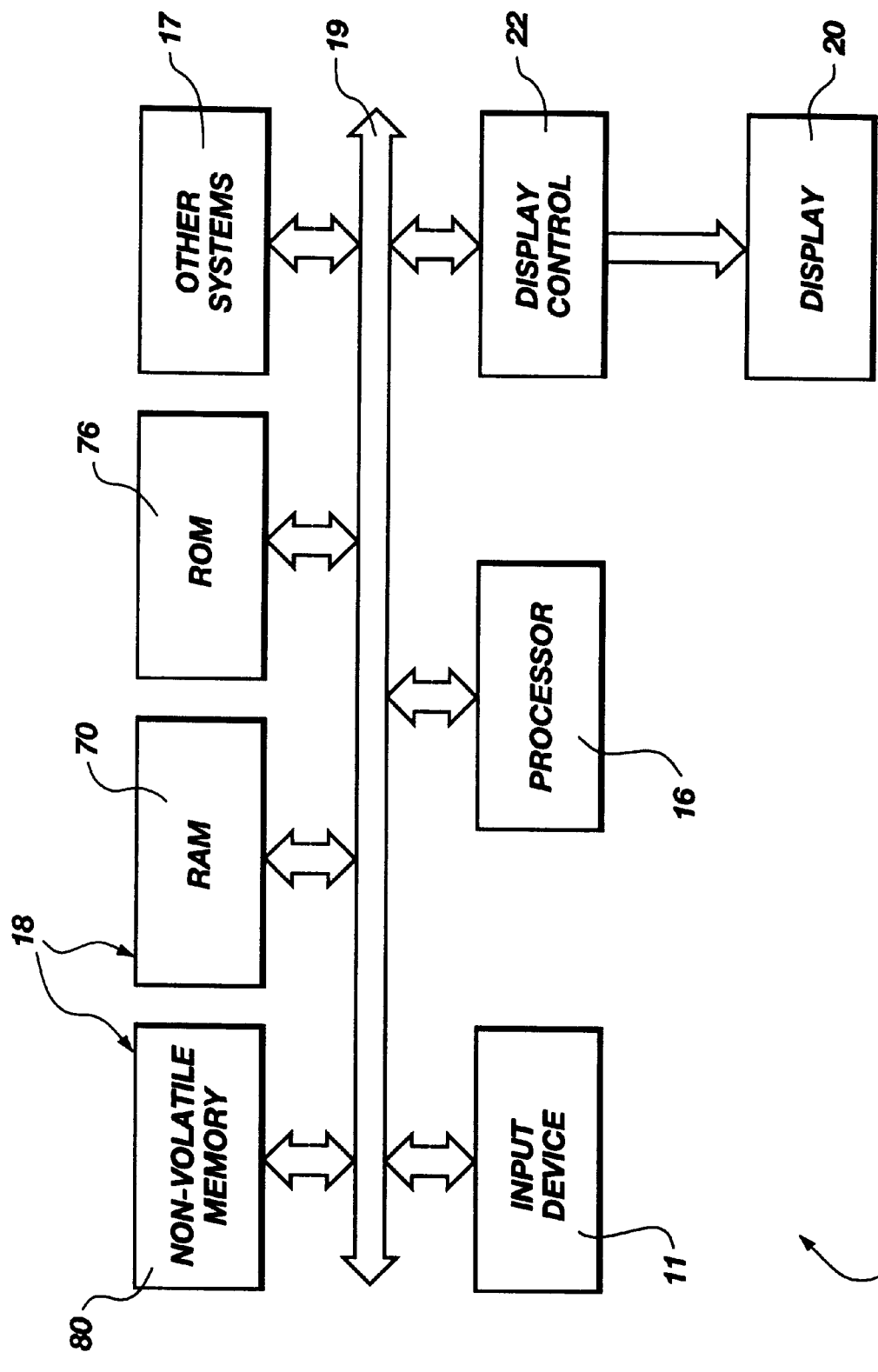
FIG. 1 is a block diagram of hardware associated with a controller made in accordance with the invention.

Referring now to FIG. 1, a channel loop controller 10 may be made in accordance with the invention to include an input device 11 for providing user inputs to the controller 10. One or more memory devices 18 may be associated with a processor 16 for storing information temporarily or permanently, as required. A display 20 may be controlled by the processor 16 through a display control 22.

In certain embodiments of the controller 10, the memory devices 18 may be physically included in a chip identified with the processor 16. In alternate embodiments, the memory device 18 may be connected to the processor 16 over a bus 19.

The memory device 18 may also include a read-only memory 76 (ROM), a random access memory 70 (RAM), and/or a non-volatile memory (NVRAM) or storage device 80. It will be appreciated by one skilled in the art that a wide variety of other types of memory devices may be used, such as PROM, EPROM, EEPROM, etc.

Internally, a bus 19 may operably interconnect the processor 16, memory devices 18, input devices 11, and display control 22. The bus 19 may be thought of as a data carrier. As such, the bus 19 may be embodied in numerous configurations. Wire, fiber optic line, wireless electromagnetic communications by visible light, infrared, and radio frequencies may likewise be implemented as appropriate for the bus 19.

An input device 11 may include one or more physical embodiments. For example, the input device 11 may be embodied in a set of buttons disposed on the television. Alternatively, the input device 11 may be embodied in a remote control unit 12.

Additionally, other systems 17 may be operably connected to the bus 19. Other systems 17 may include a modem, tape recorder, printer, VCR, computer, or the like.

One skilled in the art of television circuitry will realize that FIG. 1 has been greatly simplified for purposes of this disclosure. For example, the tuner, audio processing components, video processing components, timing components, memory interface, separate address and data busses, separate RGB lines, etc. have been left out to simplify FIG. 1 and focus on the primary elements utilized by the present invention. The components that have been left out of FIG. 1 are standard parts used by those of ordinary skill in the television systems arts; therefore, such components will not be greatly described herein.

In addition, the blocks used in FIG. 1 may represent several components that may be used by one skilled in the art implementing the present invention. For example, the display control 22 may comprise a character generator, a parallel to serial converter, a character rounding component, and similar components used by those skilled in the art for display control. Moreover, it will be appreciated by those skilled in the art that a ROM may be incorporated with the display control into a single integrated circuit. The other necessary components for implementing this invention may likewise be incorporated into one or more integrated circuits. Therefore, FIG. 1 is meant to be illustrative of the primary components utilized in implementing the present invention, and not limiting in scope.

Figure 2:
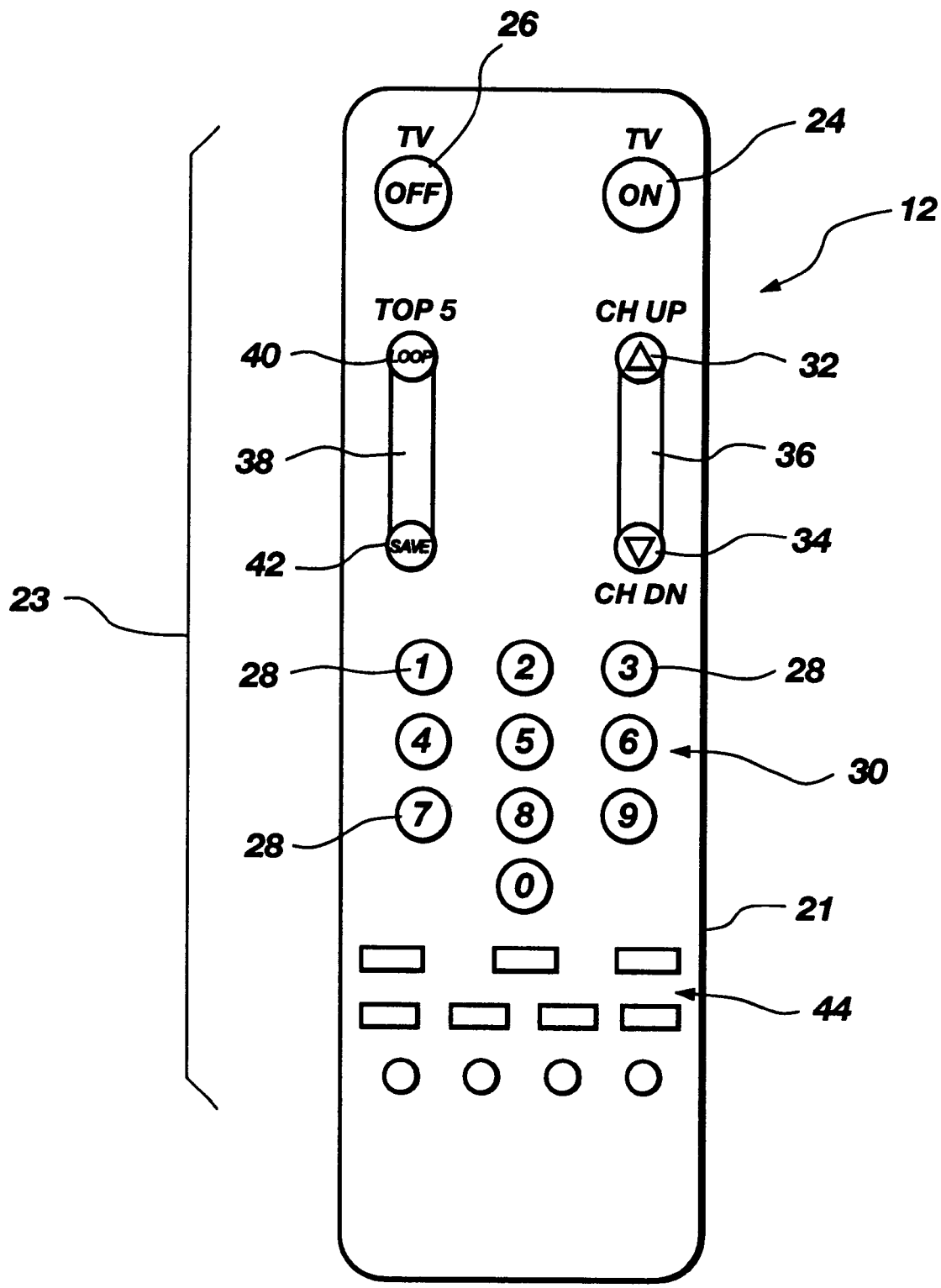
FIG. 2 is one embodiment of an input device to be used with the present invention.

Referring to FIG. 2, the remote control unit 12 may include a case 21 for structurally containing a plurality of buttons 23. In one embodiment, the remote control unit 12 may include an ON button 24, an OFF button 26, or a single button 23 that may toggle between an ON and an OFF position.

Keypad buttons 28 may form an alphanumeric keypad 30. The alphanumeric keypad 30 may contain numbers in sequence, letters in sequence, or various configurations of numbers and letters. One or more keys 44 may be included which facilitate the assigning of more than one letter to a key. For example, each digit may have several letters associated with it. One letter associated with a key may be typed in blue. The remote control unit may have a "blue" key to indicate that if a user first presses the "blue" key, a code representing the letter typed in blue will be sent to the television once a user presses that key. The latter is not necessary to describe the present invention. In addition to the keypad 30, a channel-up button 32 may be used to advance the channel, while a channel-down button 34, may be used to change a channel number downward.

The channel-up 32 and channel-down 34 buttons may be connected by a rocker bar 36. The rocker bar 36, may be used to automatically interlock the two buttons 32, 34 so that only one may be used at a time.

Similarly, a rocker bar 38 may connect a loop button 40 and a save button 42, or they may each exist as separate buttons. The loop button 40 may be used to advance through a pre-selected series of channels stored by a user. Similarly, a save button 42 may be used to store channel numbers for creating such a list. The loop button 40 and save button 42 may also be used to execute other functions of the system 10. Numerous other ancillary buttons 44 may be included in the remote control unit 12 for performing other functions, but they are not necessary to describe the present invention.

The remote control unit 12 may send a signal by wireless transmission or by a wire transmission to the processor 16. It will be appreciated by one skilled in the art that if the remote control unit 12 were to send a wireless transmission to the processor 16, a transmitter (not shown) would be required within the remote control unit 12 and a receiver (not shown) would be required within the system 10, with the receiver being operably connected to the processor 16.

Figure 3:
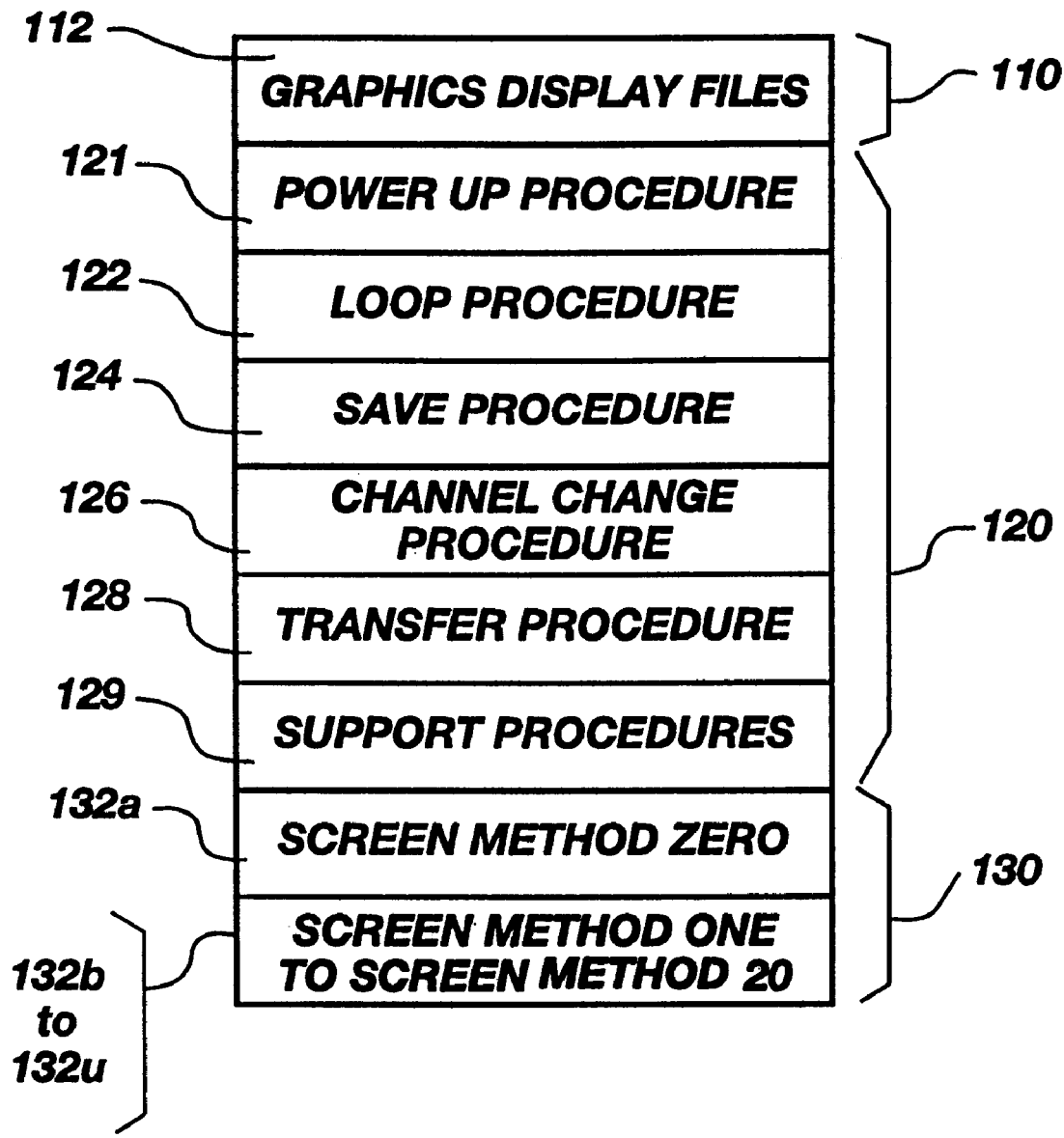
FIG. 3 is a depiction of major components that may be stored in memory in a system and apparatus made in accordance with the invention.

Referring now to FIG. 3, the data stored in the memory device 18 may be configured as illustrated schematically in FIG. 3. The data may include one or more programs which may be written in many different programming languages by anyone skilled in the art. FIG. 3 is meant to illustrate what may be in memory 18, whether it is the RAM 70, ROM 76, NVRAM 80, or the like. It is not meant to indicate a required memory map for implementing the present invention. It will be appreciated by one skilled in the art that some of the data stored in memory is preferably stored in the ROM, NVRAM, or other non-volatile memory so that if the system 10 loses power vital data necessary to run the system 10 will not be lost.

The memory device 18 may contain data of different types. For example, in one currently preferred embodiment, the memory device 18 may contain data blocks of the type characterized as files 110, procedures 120, and methods 130, such as the screen methods 130.

The files 110 may include a graphics display tile 112. The graphics display file 112 may be thought of as a file containing information describing how shapes, colors, and locations of characters, icons and text are to be displayed on the television screen.

The ROM 76 may be pre-programmed with the basic building blocks needed for the controller 10 to build displays to be shown to a user on the television screen 20. Each location in ROM 76 may contain the required picture-element information for an individual building block to be used in generating a display. For example, one location in the ROM 76 may contain the required picture-element information for the letter "a", while another may contain the information for a "b", while another may be the image of a corporate logo and so on.

The graphics display 112 may include data corresponding to icons used for feedback to a user on the television screen 20. For example, groups of channels may be combined into lists for limiting selections of a user, by preference, or by control. As a specific example, an educational channel list may be selected by a user. An icon, such as a mortar board, might quickly allow a user to identify on the screen a menu selection corresponding to a list of educational channels. Likewise, drama, comedy, and other classifications might be represented by icons output to the screen by use of corresponding data stored in the graphics display 112.

The graphics display 112 may also contain data corresponding to corporate logos used by television broadcasting networks to identify themselves.

Procedures 120 may be thought of as executable code (executable by the processor) for accomplishing certain functions within the controller 10. The procedures 120 may include a power-up procedure 121. The power-up procedure 121 may be thought of as an automatic loading process executed upon powering up the system 10. When executed by the processor 16, the power-up procedure 121 may direct the processor 16 to load data into the RAM 70. The power-up procedure 121 may also scan available channel frequencies and determine which channels have video information being broadcast thereon. The power-up procedure 121 may save all channels which do produce a detectable signal as a current channel list, a standard channels list, and a range channel list containing the entire range of available channels. This autoprogramming feature may require the processor 16 to be operably connected to a tuner (not shown). The power-up procedure 121 is also described and illustrated in relation to FIG. 8, infra.

A loop procedure 122, when executed by the processor 16, may contain instructions to control aspects of looping, such as stepping through a list of channel numbers in some desirable sequence, moving channels to different locations in a list, stepping through menu options, and erasing text directed by a user through inputs to the input device 11.

A save procedure 124, when executed by the processor 16, may contain instructions to save channels to a channel list, enter a menu mode, select menu options, tag channels in a list to indicate that they will be cleared, and clear tagged channels as directed by a user through inputs to the input device 11.

A channel change procedure 126, when executed by the processor 16, may direct the processor 16 to change channels from the currently viewed channel to a new user-selected channel directed by a user through inputs to the input device 11.

A transfer procedure 128 may include data corresponding to a set of pre-programmed instructions for controlling the processor 16 in exercising control over aspects of transferring values between variables 170. That is, certain variables 170 may be used for storing channel numbers, names, and other identifiers of lists of channels, and the like. Other variables 170 may be used for temporarily storing data. The transfer procedure 128 may provide the instructions for adding and deleting channels, channel lists, and other information to be used by the processor 16 or to be displayed on the screen 20 for feedback to the user.

Support procedures 129 may be procedures which are utilized by other procedures 121, 122, 124, 126 and 128 to assist them in carrying out their functions.

The screen methods 130, in one embodiment, may number 21. The screen methods 130 may be numbered from 0 to 20. Each of the screen methods 132*a*, 132*b*, 132*c*, and so forth, may comprise data corresponding to a set of pre-programmed instructions for use by the processor 16 in controlling the functions of the system 10 and particularly in controlling menu structures to be displayed on the screen 20.

Screen method 132*a* may be referred to as the normal viewing mode, and may be the screen method 130 in which the primary object of the invention may be carried out. Screen methods 132*b* to 132*u* may provide the data corresponding to menu structures to be displayed and instruction sets to be executed by the processor 16 to carry out the creation, editing, deletion, loading, locking, and labeling of channels and channel lists. The screen methods 132*b* to 132*u* may also contain instructions to alter the function of the loop button 40, the save button 42, and the channel buttons 32, 34 in their respective menu screens. Thus, the loop button 40 and save button 42 may be used to make more complex instructions transparent to a user. In this way a user need only exercise a limited amount of control over a limited number of buttons in a standard way, while the processor 16 executes the underlying complex instructions necessary to control the tuner (not shown) and all other inputs that eventually result in outputs to the display 20.

A program as outlined in FIG. 3 may be created with an internal structure consisting of variables. Table 1, which will be set forth herein, may represent a variable declarations portion of a program written in pascal. The variables may include different types of data including integers 222 and characters 223. Integer variables 222 may be used to represent an integer number value or a flag. One or more character variables 223 may be used to store a string of characters that may be used as text messages, channel list labels, and alpha numeric logos. Integer 222 and character 223 variables may be grouped together to create another type of variable, a record variable 224. Record variables 224 may allow many different integer 222 and character 223 variables to be grouped together as a single entity. Record variables 224 may be grouped together to create a stack variable 226. Stack variables 226 may be used as channel lists, display lists, buffer lists, and directory lists. Stack variables 226 may be grouped together to create an array variable 228. An array variable 228 may allow the processor 16 to access each individual stack variable 226 by position in the array.

TABLE 1

| | |
|---|---|
| 222 | addok, autok, begun, bucket, changeok, chn1, chnltime, choff, collapse, check, compare, createok, deleteok, direction, dispformat, editok, erase, erasecolor, eraseout, erasetime, exits, exitmenu, expand, final, first, formatok, foundit, freebar, freeok, fresh, froma, fromb, highlight, gbye, ghosts, highlight2, iconok, labelok, last, listok, loadok, location, lockchok, logok, loopoff, loopout, looptime, main, masterok, motor, moveok, n, nomatch, normal, noshow, num1, num2, pickok, place, powerup, pushed, range, replaceok, reset, rtmloop, sameway, saveit, savetime, savout, savup, secureok, scrmthd, sets, showlogo, showtime, sideboxok, sidechange, sidok, sindex, spellok, squash, stilldown, stop, swap, starterase, startmenu, switch, t, tempcurrch, temprange, tempsindex, tempuse, tooa, toob, track, tvok, tunercount, usecurr, use1, useloop, uset, wholething : integer, |
| 224 | arecord = record  identification:integer; address:integer; mailbox1:integer; mailbox2:integer; channel:integer; stationid:integer; icon:integer; lock:integer; indexs:integer; total:integer; |
| 223 | character:string[43]; end; |
| 226 | astack = array[0..26] of arecord; |
| 228 | var anarray:array[0..19] of astack; |

Numerous methods exist by which data may be associated to other data. For example, databases and indexing may provide identification of data by type, without specific information being present in the data itself as to its nature or location. Alternatively, information may be provided with identification by which the data may be accessed after scanning for certain flags or identifiers.

It will be appreciated by one skilled in the art that data could be formatted in a wide variety of ways without departing from the scope of the present invention. For example, a record variable 224 need not have 11 fields. Furthermore, a record variable need not be used with the present invention. The data structures and operations set forth herein are only exemplary of how data may be structured and manipulated within the present invention, and the specific detail of such structures and operations are not meant to be limiting in scope.

Figure 4:
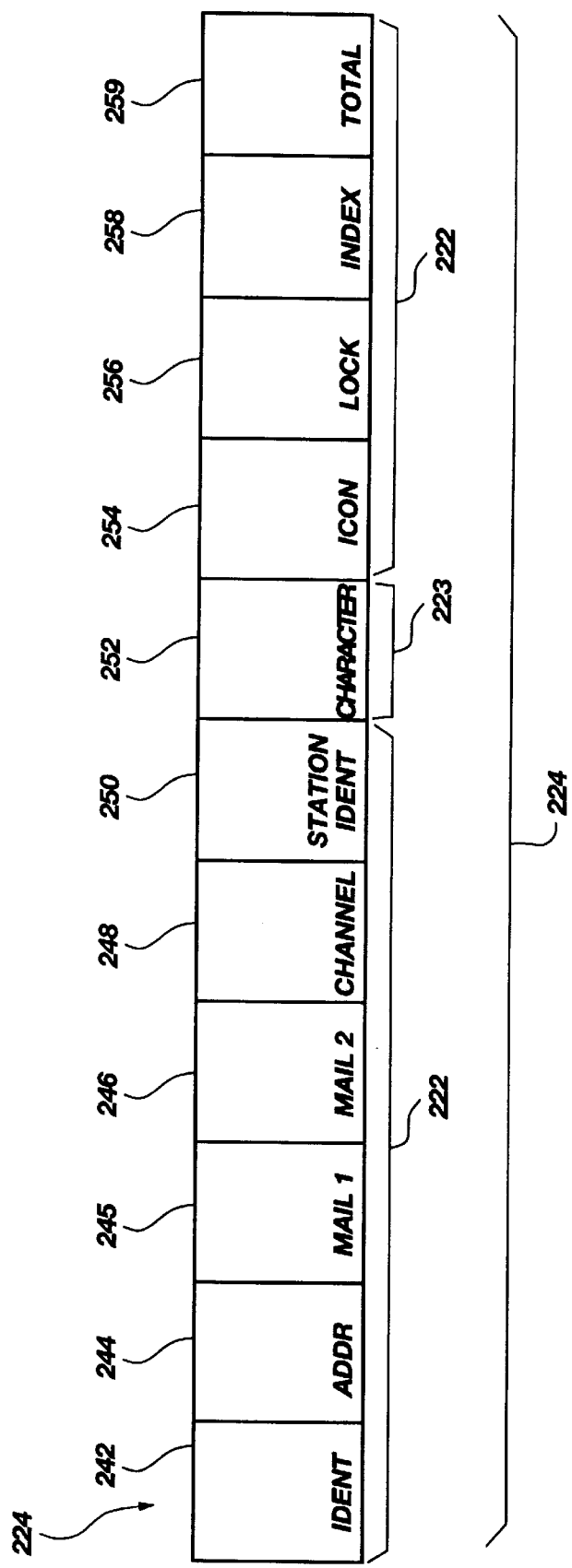
FIG. 4 is a depiction of the structure of an individual record.
Figure 5:
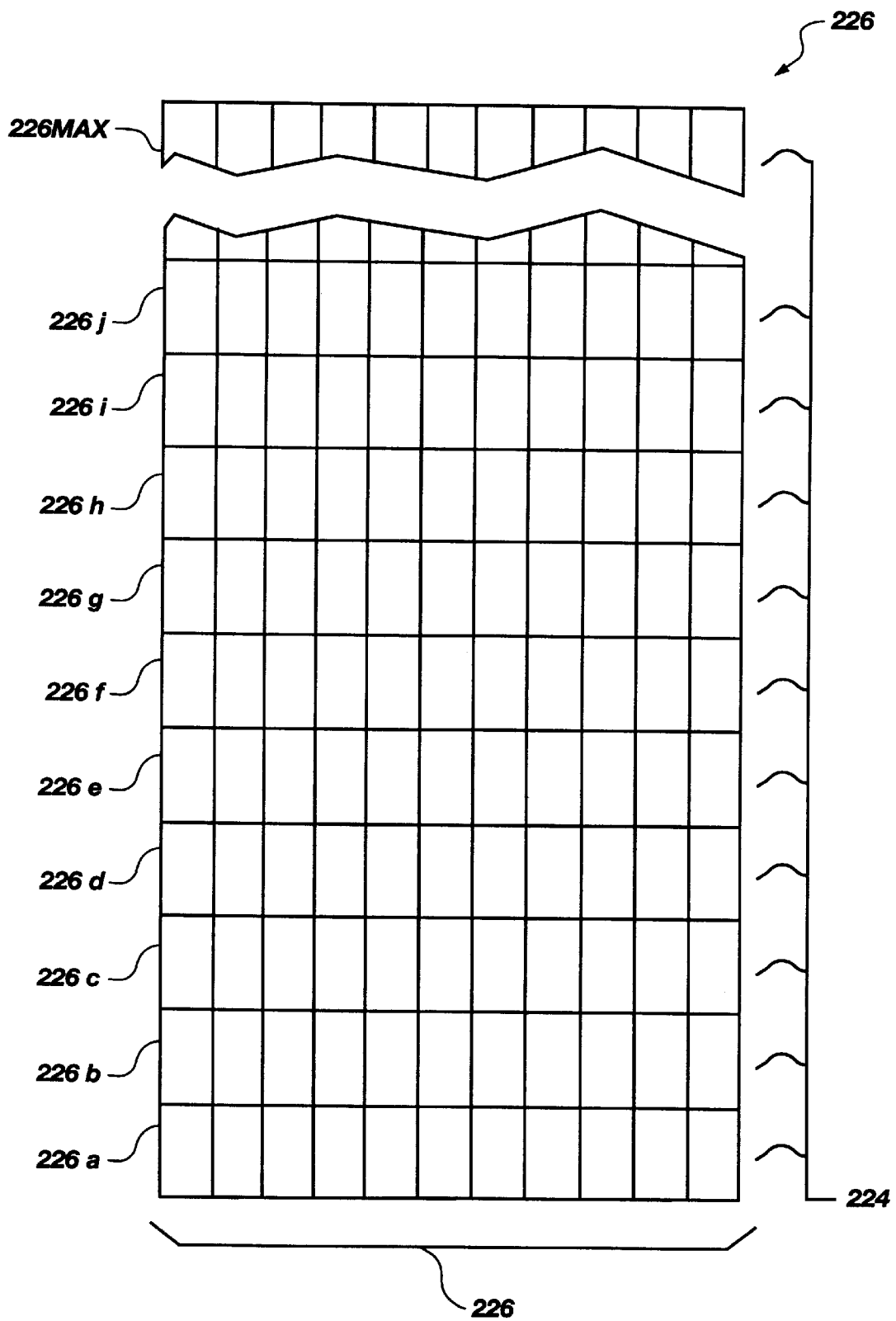
FIG. 5 is an illustration of a stack variable including the same data structure illustrated in FIG. 4.
Figure 6:
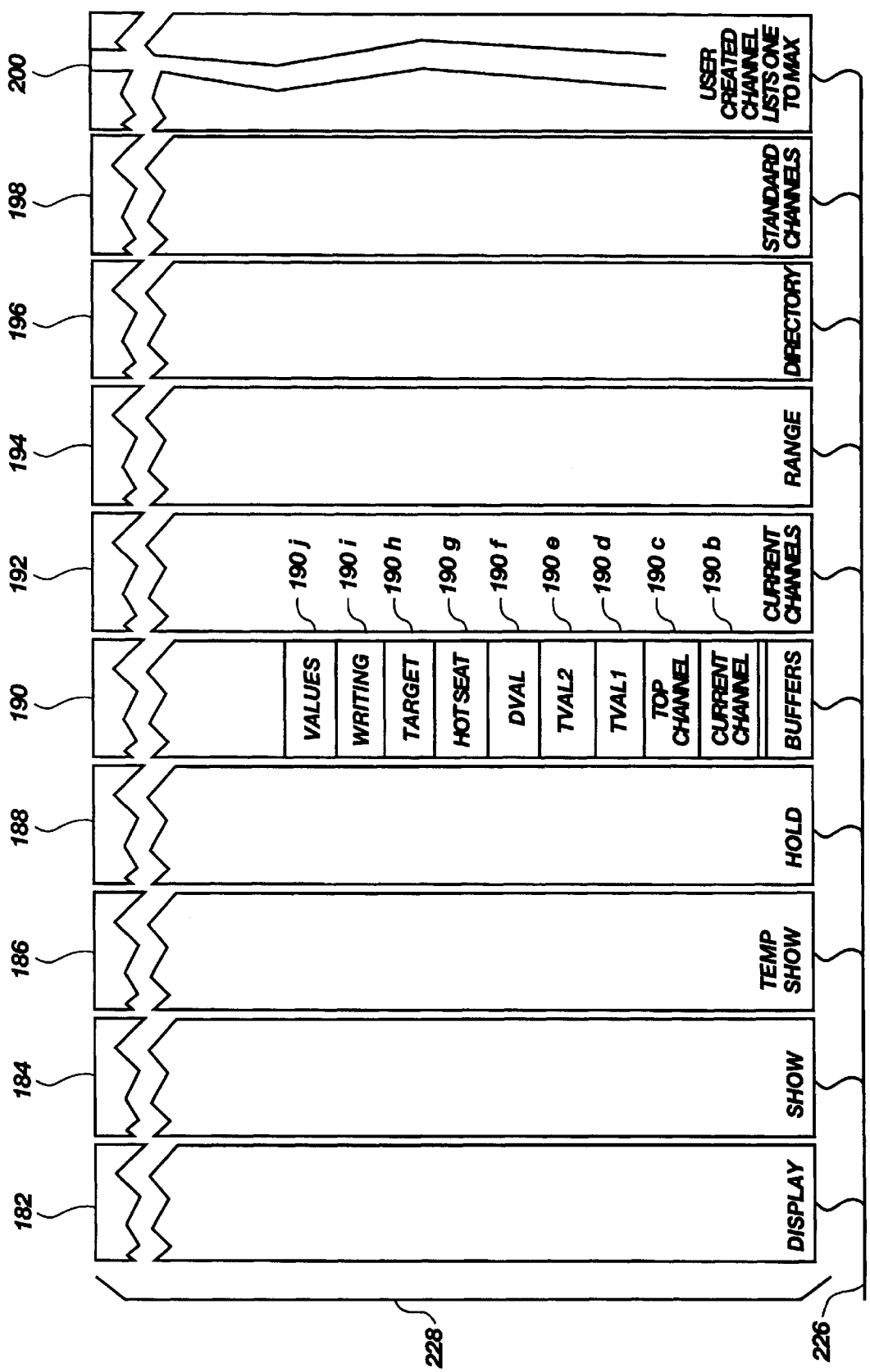
FIG. 6 is a block diagram of an array of stack variable data structures in memory in an apparatus and method in accordance with the invention.

FIGS. 4, 5, and 6 further describe the variable structures used by the processor 16 to store data corresponding to information in the RAM 70, ROM 76, and/or the non-volatile memory 80.

Referring now to FIG. 4, a record variable 224 may contain ten integer variables 222 and one character variable 223.

An identification integer 242 may be used to identify to which stack variable 226 the record variable 224 belongs.

An integer address block 244 may be used to identify the current record 224 in a stack 226.

A mailbox1 integer 245 may be used to identify a stack variable 226 from which the data residing in the current record 224 came from. A mailbox2 integer 246 may be used to identify a record variable 224 from which the data residing in the current record variable 224 came from.

A channel integer block 248 may include an integer representing a number of a channel. Other fields may also be added to the channel block 248 as useful.

A station ID integer block 250, or station ID 250, may include an integer referring to a graphics file 110 corresponding to a figure such as a logo, letter, or other graphic representing a corporate logo when displayed on the screen 20.

A character block 252 may include text information to provide user messages, instructions, passwords, station logos, or other character strings to be displayed on the display 20. Text messages may be overlaid or interspersed with other standardized, pre-constructed images on the display 20.

An icon integer block 254 may contain an integer referring to a graphics file 110 corresponding to an icon, image, figure, or the like to be displayed on the screen 20, such as in a menu, for identifying channel lists. That is, a user may group a selected number of channel lists according to the material contained therein. For example, comedy, drama, news, sports, education, and the like may be classifications of channel lists.

A lock integer 256 may be used as a flag to indicate that the data in the stack variable 226 related to the current record variable 224 may be accessed only via a password stored in a character block 223.

An index integer 258 may be used to access a record variable 224 in the current stack variable 228. A total integer 259 may be used to indicate the number of records comprising the current stack variable 226. In alternative embodiments, each of the blocks or variables 242, 244, 246, 248, 250, 252, 254, 256, 258 may contain more than a single field. Actually, any number of fields may be used. However, in a system 10 made in accordance with the invention, the numbers of variables, and contained fields as described herein may perform suitably.

Referring to FIG. 5, a stack 226 may be configured using records as illustrated in FIG. 4. The entries 226a to 226max comprise the stack 226. The lowest record in the stack 226a may act as an interfacing record containing vital statistics concerning the stack. The identification variable 242 may identify the stack 226 to the processor 16. The character variable 252 may contain the alphanumeric password value. The icon variable 254 may identify an icon in the display graphics file 112 to be used to describe the stack 226. The lock value 256 may indicate that the stack 226 is lock protected. The index value 258 may describe which record 226a to 226max is the current record of interest. The total variable 259 may indicate how many records 226a to 226max comprise the stack. Records higher than 226a, 226b to 226max, may be used to store information to be used as a display list, a channel list, a temporary channel list, a buffer list, or a directory list, as described in FIG. 6.

Referring now to FIG. 6, an array 228 may be created by grouping a number of stack variables 226 together so that the processor 16 may access the information within by referring to is the stack position, then to the record position in the array 228. The number of stacks in the current embodiment of the invention may be ten, with additional stacks to be added in the form of channel lists created by the user. It will be appreciated by one skilled in the art that the method of storing data may be applied in a wide variety of ways without departing from the scope of the present invention. The stack variables 226 comprising the array 228 may include several different variables, as illustrated in FIG. 6.

A display variable 182 may hold data to represent the current state of the screen 20. The display variable 182 may receive data used in controlling the screen 20 from the show variable 184. The data used by the display stack variable 182 may create a sidebox display 134, or menu option bars 141a to 141e to be displayed to the screen 20.

A show variable 184 may be used as a temporary storage list to hold all the data of the list being used by the display variable 182 to provide a sidebox display 134 or menu screens to be displayed to the screen 20.

A temp show variable 186 may hold the contents of the show variable 184 during the menu mode, then return them to the show variable 184 upon exiting the menu mode.

A hold variable 188 may be used as a buffer for the contents of any channel list being edited during the menu mode. Editing in this method may allow an edit session to be canceled without saving changes made during editing.

A buffer variable 190 may be used as temporary storage by different procedures 120. In the current embodiment the number of records used as buffers may be nine.

Record number one 190b may be referred to as the current channel buffer and may use a channel integer 248 to provide data to a tuner to use in locating and tuning a channel to be displayed to the screen 20.

Record number two 190c may be referred to as the top channel buffer, and may use a channel integer 248, a station identification integer 250, and character block 252 to represent the current state of the top channel display 137 to be displayed to the screen 20.

Record number three 190d may be referred to as the TVAL1 buffer, and may use a character block 252 to represent the current state of the upper menu instruction bar 164 text to be displayed to the screen 20.

Record number four 190e may be referred to as the TVAL2 buffer, and may use a character block 252 to represent the current state of the lower menu instruction bar 164 text to be displayed to the screen 20.

Record number five 190f may be referred to as the DVAL buffer, and may use a character block 252 and a mailbox2 integer 246 to distinguish between sidebox display (i.e. channel icons) or menu mode display (i.e. menu option bar3) to be displayed to the screen 20.

Record number six 190g may be referred to as the hotseat buffer, and may use the character value, and the mailbox2 value to provide a reference as to which channel list is being edited during the menu mode.

Record number seven 190h may be referred to as the target buffer, and may use a channel integer 248, a station identification integer 250, and character block 252 to inform the processor 16 as to which channel is being edited during the menu mode.

Record number eight 190i may be referred to as the writing buffer, and may use a character block 252 to provide user writable autoprogramtext for passwords, channel list labels, and channel logos during the menu mode.

Record number nine 190j may be referred to as the values buffer, and may use all integer 222 and character 223 values to provide a transfer procedure 128 a template as a means to control which values are transferred between variables.

A current channels variable 192 may be used as a list of viewable channels created during the autoprogram procedure. A current channels variable 192 may be indexed by the channel change buttons 28, 30, and 32, and may be considered the normal set of channels. Any channel list may be loaded into a current channels variable 192 to be used as the normal set of channels for normal television viewing.

A range variable 194 may be used as a list of all possible channels, either viewable or not, during the autoprogram procedure. A range variable 194 may provide access to any channels not part of the current channels variable 192 by pressing channel change keys 28, provided a desired channel has not been security protected during a menu mode.

A directory variable 196 may be used as a directory listing of all channel lists 198 to 200 available for viewing.

A standard channel variable 198 may be used as a list of viewable channels created during the autoprogram procedure 270, and identical to the current channels variable 192. The standard channels variable 198 may be thought of as a means to store a list of all channels available for viewing as opposed to user created channel lists which may contain more restricted channel selections.

Channel list variables 200—maximum may be user created channel lists, the number of which may only be limited by available space in a memory device 18 (max).

OPERATIONS

Figure 7:
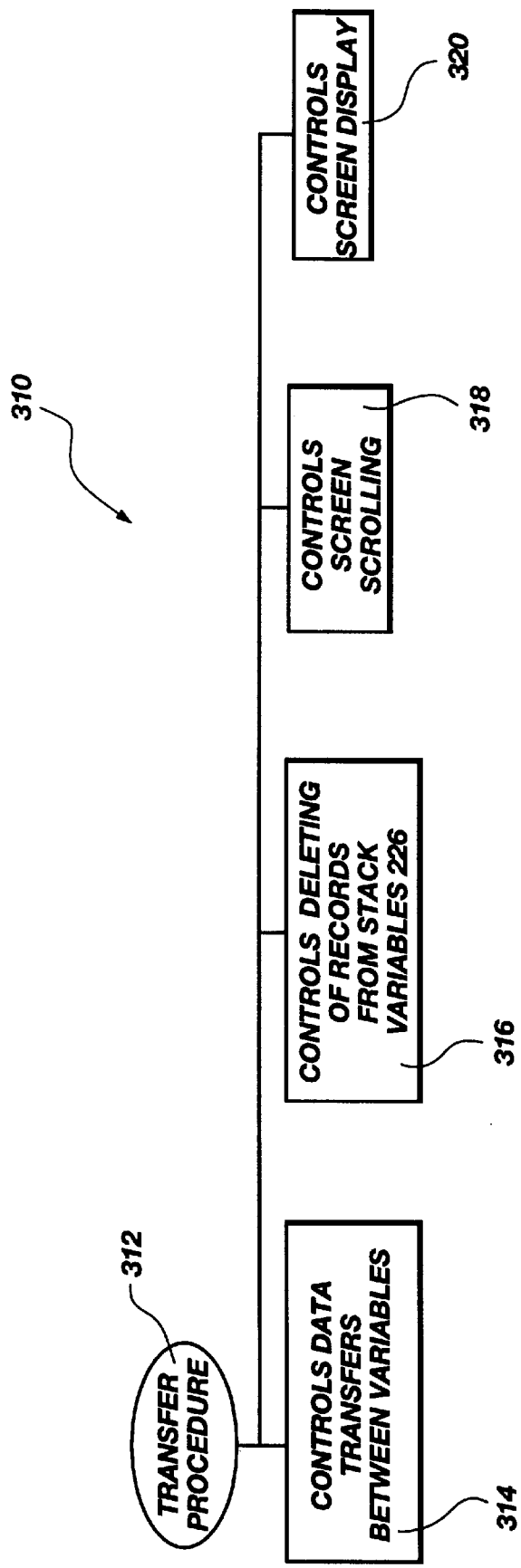
FIG. 7 is a flow diagram illustrating the various functions that may be performed by a variable transfer procedure.

Referring to FIG. 7, a transfer procedure 310 may be initiated 312. A transfer procedure 312 may control the data transfer 314 between stack variables 226 in the array 228. Procedures 120 and screen methods 130 may use the transfer procedure 310 to perform the work necessary for the processor 16 to execute respective procedure 120 and screen method 130 functions, such as the deletion 316 of records 224 from stack variables 226, screen scrolling 318 when more than five total records 226 are in the show stack variable 184 to be displayed 320 by the display variable 182 to the screen 20.

Figure 8:
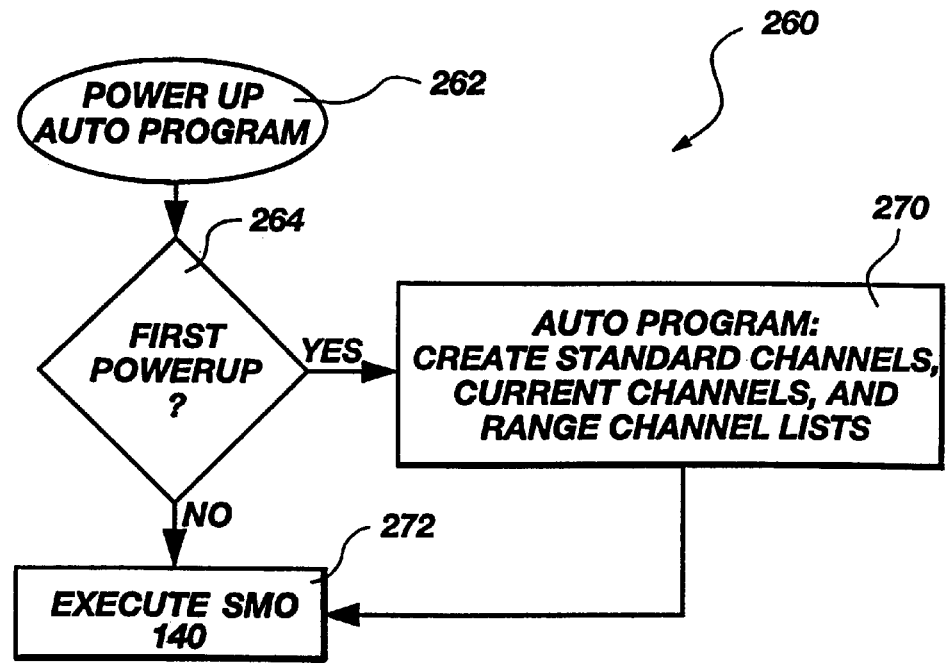
FIG. 8 is flow diagram illustrating a power up process and several tasks that may be associated therewith.

Referring to FIG. 8, an autoprogram procedure 260 may be initiated 262 upon powering up the system 10. A processor 16 may perform a test 264 to determine if the power being applied is the first to the system 10. If the processor 16 determines the latter to be true, then an autoprogram procedure 270 may instruct a tuner operably connected to the system 10 to index through the range of available channels. The processor 16 may store all available channels to a range channel list 194, and store only those channels with a viewable signal to a standard channels list 198 and a current channels list 192. The processor 16 may then execute 272 screen method zero. If the processor 16 determines the test 264 to be false, then screen method zero may be executed 272 without performing the autoprogram procedure 270.

Figure 9:
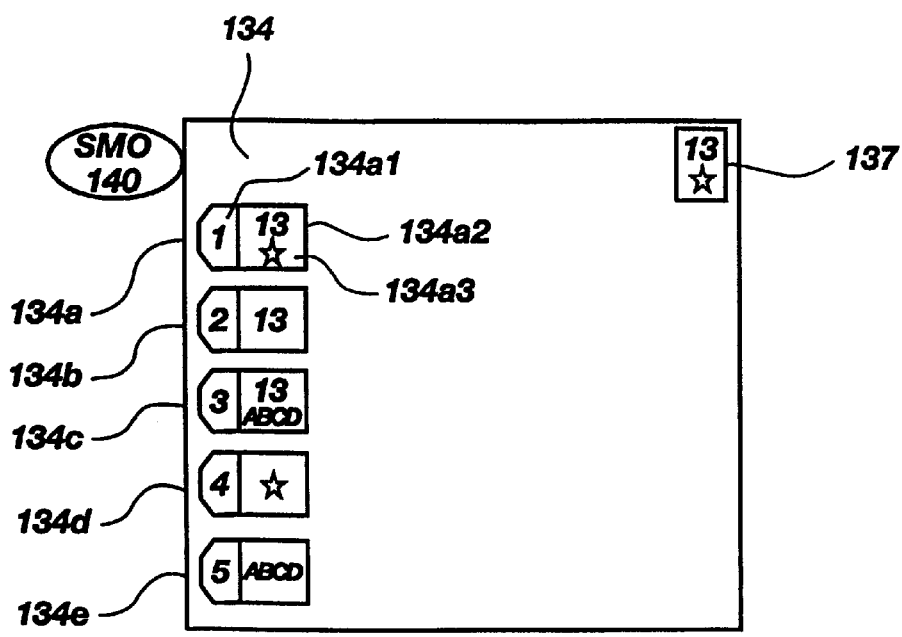
FIG. 9 is an illustration of screen method zero, which may be referred to as the normal viewing mode.

Referring to FIG. 9, screen method zero 140 may be thought of as normal television viewing mode, and may contain a channel display 137 showing the channel and station identification of the current channel displayed to the screen 20. A sidebox display 134 containing zero to five active sideboxes 134a–134e. Each active sidebox may contain a sidebox number 134a1, a channel number 134a2, and a station identification logo 134a3. FIG. 9 shows five different graphical manners in which a sidebox may be formatted to display the channel number and/or station identification logo. A sidebox display 134 may be set to display channel only 134a, channel and corporate station identification logo 134b, channel and alphanumeric logo 134c, corporate station identification logo only 134d, and alpha-numeric logo only 134e. Pressing the save button 42 may store the current channel displayed to the screen 20 to the sidebox display 134. Dragging the loop button may reverse the looping direction through the sidebox display 134. Dragging the save button 42 may enter a menu mode. A more detailed description of the function of the loop button 40, save button 42, and channel change buttons 28, 32, and 34 may be found in relation to FIGS. 10, 11, and 12.

Figure 10:
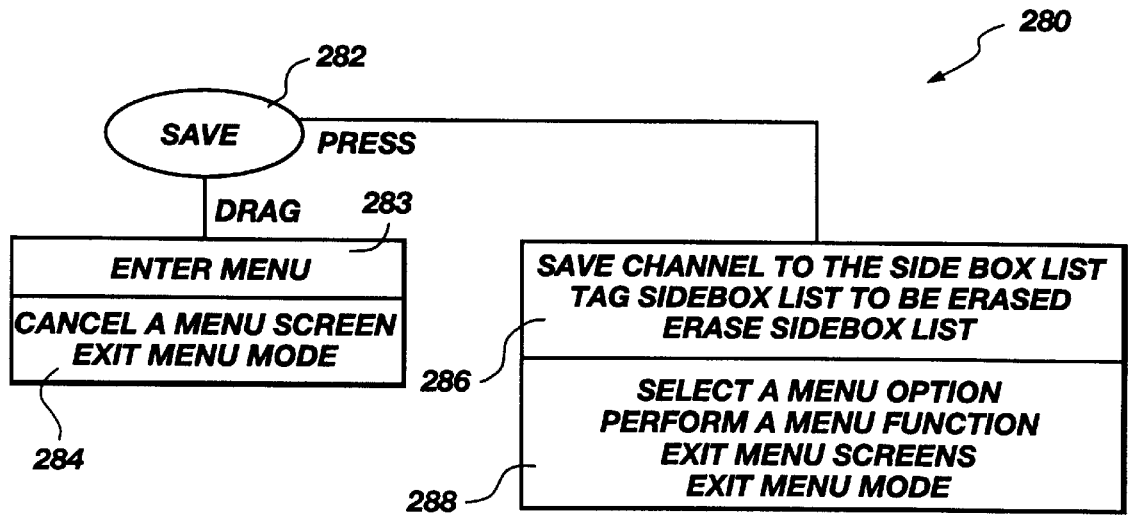
FIG. 10 is a flow diagram illustrating various functions that may be initiated by a save button.
Figure 11:
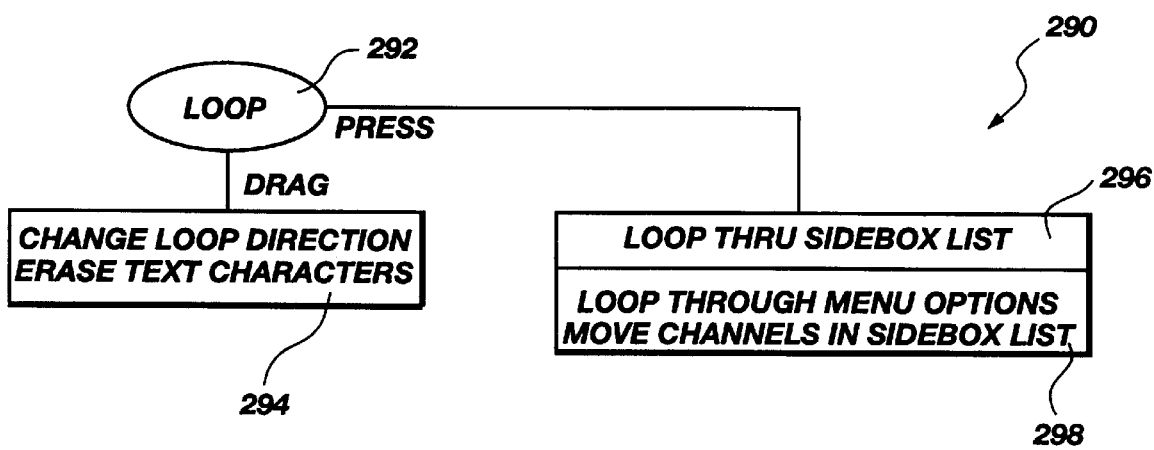
FIG. 11 is a flow diagram illustrating various functions that may be initiated by a loop button.
Figure 12:
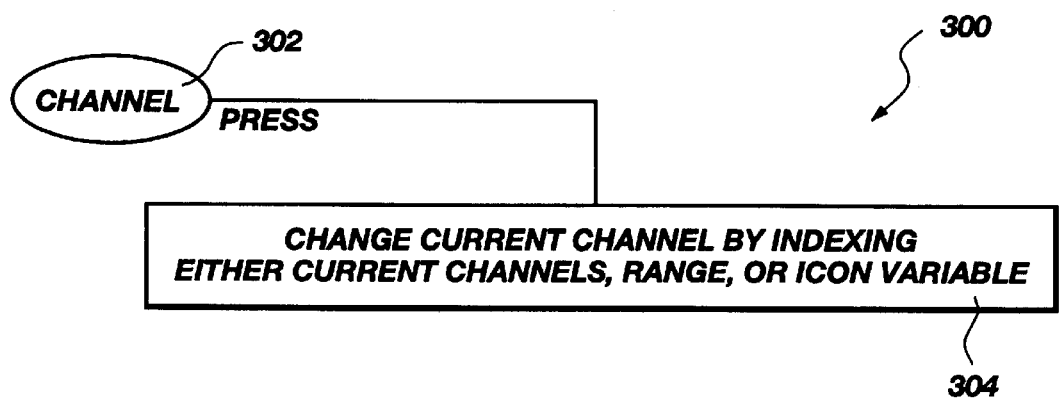
FIG. 12 is a flow diagram illustrating the process that may be initiated by channel up/down buttons or numeric keypad buttons.

Referring to FIGS. 10, 11, and 12, the remote control unit 12 may be used as a platform to support a loop button 40, a save button 42, and channel change keys 28, 32, and 34. Pressing the save button 42 while in normal television mode 283 may store the current channel displayed on the screen 20 to the sidebox display 134. Pressing the save button while the channel in the current sidebox 134a matches the channel in the channel display 137, may cause all active sideboxes 134a–134e to be tagged, by such methods as a color change, blinking, or the like, as an indication to the user that the next press of the save button may erase all active sideboxes from the screen 20. Pressing either the loop button 40 or channel change buttons 28, 32, or 34 before pressing the save button 42 again may remove the tags so that another channel may be saved by pressing the save button 42 again. Pressing the loop button 40 during normal television viewing may enable the user to loop through sideboxes 134a–134e or menu option bars 139 while in menu mode 298. By holding the loop button 40 in a depressed position for a pre-programmed period of time 294 recognized by the processor 16, a user may reverse looping direction upward or downward through the sidebox display 134 or menu option bars 139. Text may be erased one character at a time from freebar 162b as long as the loop button 40 is depressed during screen method nineteen 159 and while freebar 162 is highlighted.

MENU SCREENS

Referring to FIGS. 13, 14, 15, 16, and 17, menu screens may be made up of menu bars 139 or a sidebox display 134. Each menu bar 139 may contain a text section described in each menu drawing as a subset of the menu screen 130, (i.e. the first menu bar of screen method one 141 is denoted as 141a). Each menu bar 139 may also contain an icon display window 139b to display icons, logos, or other graphic matter to the screen 20, and a lock display window 139c. To indicate that a menu option may be password protected, as a convention herein each menu screen SM0 140 to SM20 160, may have an accompanying pentagonal arrow group 131. The pentagonal arrow symbol 131 contains a reference pentagonal arrow group 131. The pentagonal arrow symbol 131 contains a reference, such as SM1 141, SM2 142, etc., indicating which screen method 133 will be displayed upon activation (selection) of a menu entry corresponding to the pentagonal arrow 131.

Figure 13:
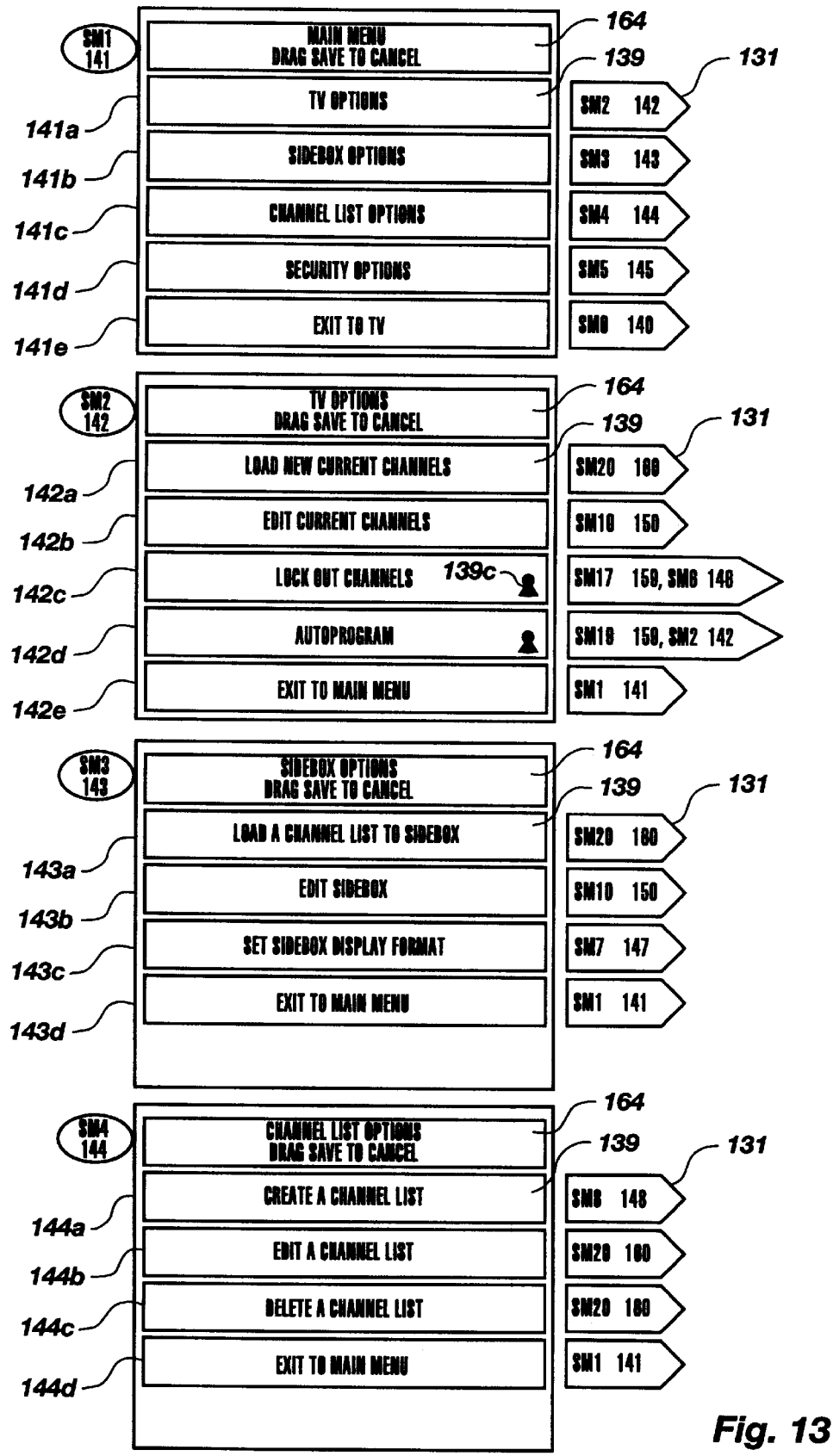
FIGS. 13–17 are illustrations of various screen methods, which may be referred to as menu mode, that may be used in operation of an apparatus and method in accordance with the invention.

Referring to FIG. 13, screen method 141 may be the first menu screen in a series of different menu screens designed to accomplish different tasks such as creating, modifying, loading, locking, deleting, and displaying channel lists. Screen method one 141 may be considered the entrance to the menu mode. Screen method one 141 may contain an instruction bar 164, and five menu bars 141a–141e. The first four may contain an option concerning the four major sections of television control, and the last menu bar 141e may be an exit to normal television viewing. Pressing the save button 42 while a menu bar 141a–e is highlighted may be referred to as "selecting" throughout the remainder of the descriptions of menu screens 141–160. Selecting menu bar 141a may provide television control options via screen method two 142. Selecting menu bar 141b may provide sidebox control options via screen method three 143. Selecting menu bar 141c may provide channel list control options via screen method four 144. Selecting menu bar 141d may provide security control options via screen method five 145. Pressing the loop button may loop through the menu options. Dragging the loop button may reverse the looping direction.

Screen method two 142 may be a child menu to screen method one 141. Screen method two 142 may contain an instruction bar 164, and five menu bars 142a–142e. The first four may contain an option concerning the operation of normal television related features, and the last menu bar 142e may be an exit to screen method one 141. Selecting menu bar 142a may load a selected channel list to the current channels list via screen method eighteen 158. Selecting menu bar 142b may edit the current channel list via screen method nine 149. Selecting menu bar 142c may lock out unwanted channels via screen method four 144. If a lock display icon 139c is present in menu bar 142c then access to the lock out procedure will not be allowed until the master password is entered via screen method nineteen 159. Selecting menu bar 142d may initiate an autoprogram procedure and return to screen method two 142. If a lock icon display is present in menu bar 142d, then access to the autoprogram procedure may not be allowed until the master password is entered via screen method nineteen 159. Pressing the loop button may loop through the menu options. Dragging the loop button may reverse the looping direction, dragging the save button may cancel and return to screen method one 141.

Screen method three 143 may be a child menu to screen method one 141. Screen method three 143 may contain an instruction bar 164, and four menu bars 143a–143d. The first three may contain an option concerning the operation of sidebox related features, and the last menu bar 143d may be an exit to screen method one 141. Selecting menu bar 143a may load a selected channel list to the sidebox display via screen method eighteen 158. Selecting menu bar 143b may edit the current sidebox list via screen method nine 149. Selecting menu bar 143c may set the display format for the sidebox display via screen method six 146. Dragging the save button may cancel and return to menu screen one. Pressing the loop button may loop through the menu options. Dragging the loop button may reverse the looping direction.

Screen method four 144 may be a child menu to screen method one 141. Screen method four 144 may contain an instruction bar 164, and four menu bars 144a–144d. The first three may contain an option concerning the operation of channel list related features, and the last menu bar 144d may be an exit to screen method one 141. Selection menu bar 144a may create a channel list via screen method seven 147. Selecting menu bar 144b may edit a channel list via screen method nine 149. Selecting menu bar 144c may delete a channel list via screen method eighteen 158. Dragging the save button may cancel and return to menu screen one. Pressing the loop button may loop through the menu options. Dragging the loop button may reverse the looping direction.

Figure 14:
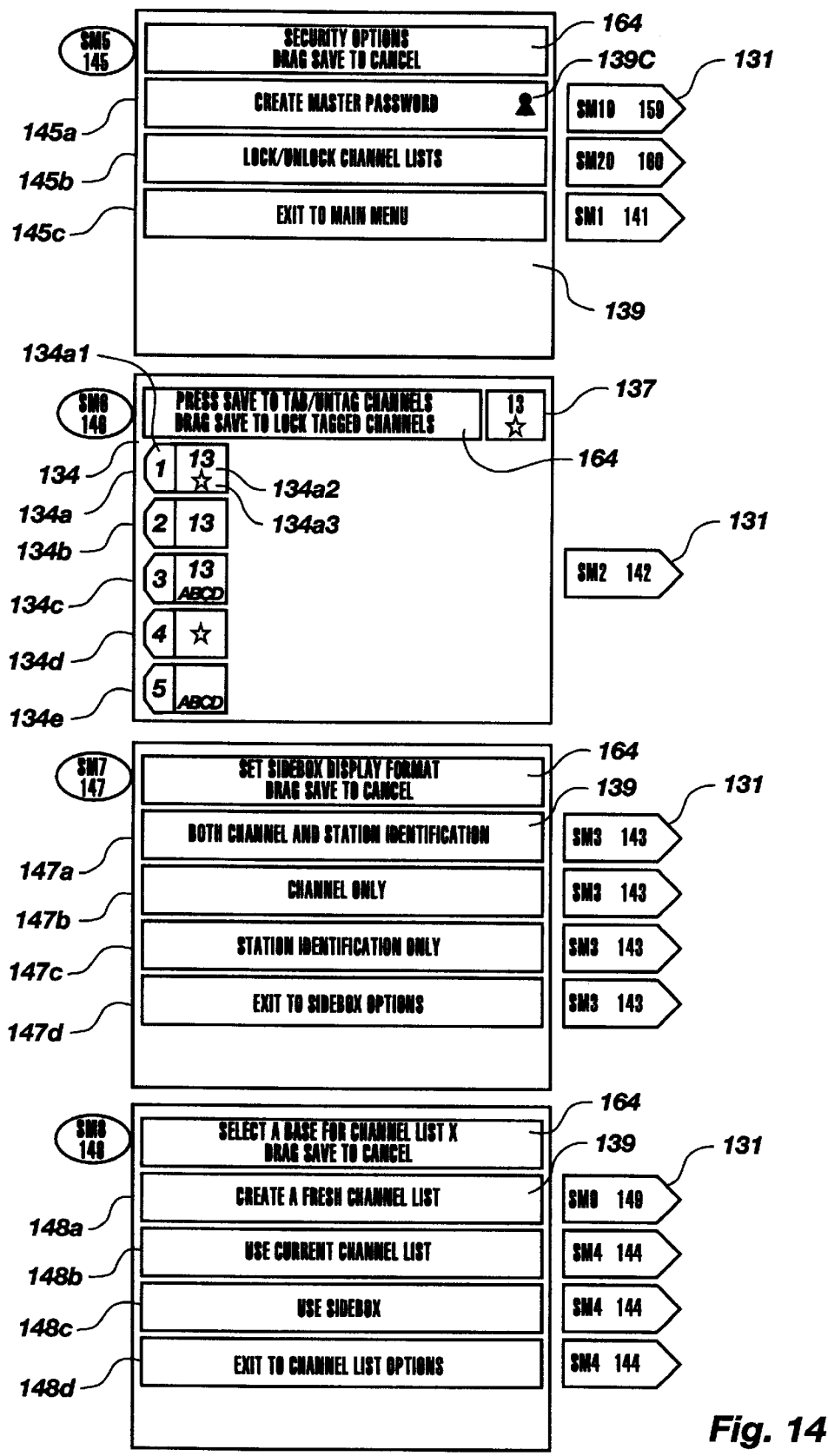

Referring to FIG. 14, screen method five 145 may be a child menu to screen method one 141. Screen method five 145 may contain an instruction bar 164, and three menu bars 145a–145c. The first two may contain an option concerning security related features, and the last menu bar 145c may be an exit to screen method one 141. Selecting menu bar 145a may create a master password via screen method nineteen 159. If a lock icon display 139c is present in menu bar 145a, then access to the master password creation procedure will not be allowed until the master password is entered via screen method nineteen 159. Selecting menu bar 145b may lock individual channel lists via screen method twenty 160. Pressing the loop button may loop through the menu options. Dragging the loop button may reverse the looping direction. Dragging the save button may cancel and return to screen method one 141.

Screen method six 146 may be a child menu of screen method two 142. Screen method six 146 may contain a sidebox display 134, a channel display 137, an instruction bar 164, and one to five active sideboxes 134a–134e. The channel list displayed may be from the range channel list 194 and may display all available channels including those which do not have a viewable signal. Pressing the save button 42 on a highlighted sidebox may tag that sidebox, thus locking that channel from being accessed through the numeric channel change keys 28. Therefore, if a channel locked in this manner does not exist in the current channels list 192, then that same channel may not be accessed by any of the channel changing keys 28, 32, and 34. Pressing the save button 42 again will untag the channel. Once all desired channels have been tagged, dragging the save button may save all tag choices and return to screen method two 142. Pressing the loop button may loop through the sidebox display. Dragging the loop button may reverse the looping direction.

Screen method seven 147 may be a child menu to screen method three 143. Screen method seven 147 may contain an instruction bar 164, and four menu bars 147a–147d, the first three may contain an option concerning the sidebox display format, and the last menu bar 147d may be an exit to screen method one 141. Selecting menu bar 147a may cause both the channel and station identification logo to be displayed together in the sidebox display 134. Selecting menu bar 147b may cause the channel only to be displayed in the sidebox display 134. Selecting menu bar 147c may cause the station identification logo only to be displayed in the sidebox display 134. Screen method seven 147 may exit to screen method three 143 after a selection is made. Pressing the loop button may loop through the menu options. Dragging the loop button may reverse the looping direction.

Screen method eight 148 may be a child menu to screen method four 144. Screen method eight 148 may contain an instruction bar 164 and four menu bars 148a–148d. The first three may contain an option concerning the creation of a channel list, and the last menu bar 148d may be an exit to screen method one 141. Selecting menu bar 148a may allow a user to create a channel list 200 from scratch, or containing no initial channels, via screen method nine 149. Selecting menu bar 148b may cause the current channel list to be created as a new channel list. Once created in this manner, the new channel list may be edited via screen method nine 149. Pressing the loop button may loop through the menu options Dragging the loop button may reverse the looping direction.

Figure 15:
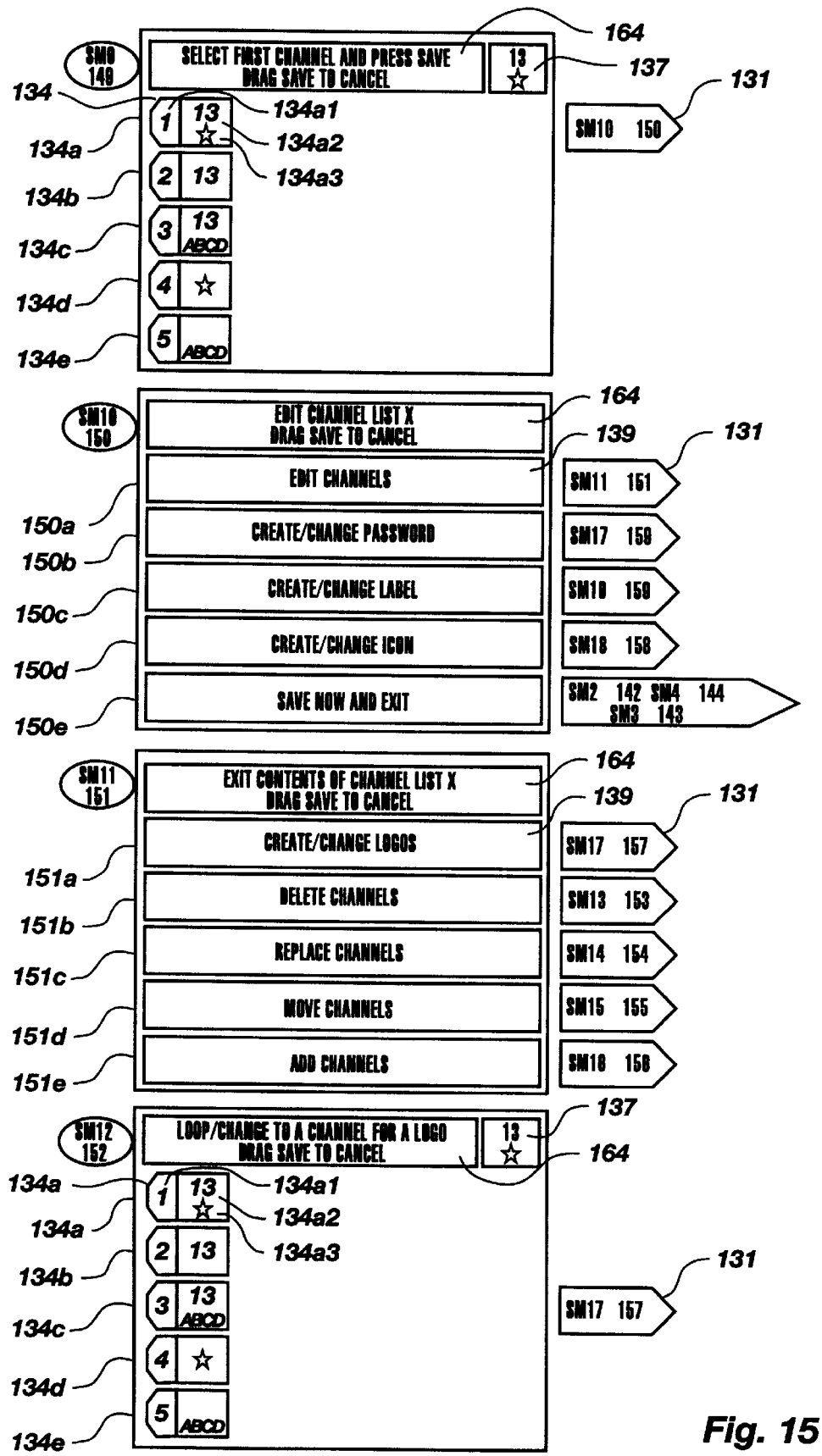

Referring to FIG. 15 screen method nine 149 may be a child menu of screen method eight 148. Screen method nine 148 may contain an instruction bar 164, a channel display 137, and may contain from zero to five active sideboxes 134a–134e. Pressing the save button 42 may save the current channel as the first channel in the channel list under construction to the first sidebox 134a. The function of the sidebox display 134 in screen method nine is identical to that of screen method zero 140 with the following exception: pressing the save button 42 while the sidebox display 134 is tagged may cause the sidebox channel list 134 (all contents of the show stack variable 184, which may number more than five) to be saved as a user created channel list 200, and then exit to screen method ten 150 to provide edit options for the newly created channel list.

Screen method ten 150 may be a child menu of screen method two 142, screen method three 143, or screen method four 144. Screen method ten may contain an instruction bar 164 and five menu option bars 150a to 150e. The first four may contain an option concerning the types of changes to be made to the currently edited channel list. Selecting menu bar 150a may provide options to edit the channels of the currently edited channel list via screen method eleven 151. Selecting menu bar 150b may provide a means to create or change the password of the currently edited channel list via screen method nineteen 159. Selecting menu bar 150c may provide a means to create or change the descriptive icon of the currently edited channel list. Selecting menu bar 150e may save any and all changes made to the currently edited list and exit to the parent screen method SM2 142, SM3 143, or SM4 144. Pressing the save button 42 may select a menu option. Pressing the loop button may loop through the menu options. Holding the loop button 40 may reverse the looping direction. Holding the save button 42 may cancel screen method ten and return to a parent menu SM2 142, SM3 143, or SM4 144.

Screen method eleven 151 may be a child menu of screen method ten 150. Screen method eleven 151 may contain an instruction bar 164 and five menu bars 151a–151e visible with a sixth menu option (exit menu bar) accessible via looping. The first five may contain an option concerning edit options available to the individual channels of the list being edited. Selecting menu bar 151a may provide a means to create or change station identification logos via screen method twelve 152. Selecting menu bar 151b may provide a means to delete individual channels via screen method thirteen 153. Selecting menu bar 151c may provide a means to replace individual channels via screen method fourteen 154. Selecting menu bar 151d may provide a means to move individual channels via screen method fifteen 155. Selecting menu bar 151e may provide a means to add individual channels via screen method fifteen 153. Looping to and selecting the sixth menu option may provide a means to exit to screen method eleven 151 and return to screen method ten 150. Pressing the save button 42 may select a menu option. Pressing the loop button may look through the menu options. Holding the loop button may reverse the looping direction. Holding the save button may cancel screen method eleven 151 and return to screen method ten 150.

Screen method twelve 152 may be a child menu of screen method eleven 151. Screen method twelve 152 may contain an instruction bar 164, a channel display 137, and from one to five active sideboxes 134a–134e. Screen method sixteen 156 may allow a user to add new channels to a custom list. Pressing the save button 42 on a highlighted sidebox may select the current sidebox to have a station identification logo 134a3 assigned to it via screen method seventeen 157. After a station identification logo 134a3 has been selected, the processor 16 may return control to screen method eleven 151. All active sideboxes may be tagged to indicate that another consecutive press of the save button will save all station identification logos 134a3 assigned so far, then the processor 16 may exit to screen method eleven 151. Tags may be cleared by pressing the loop button 40 or channel change keys 28. Pressing the loop button may loop through the sidebox display 134. Holding the loop button may reverse the looping direction. Holding the save button may cancel screen method twelve 152 and return to screen method eleven 151.

Figure 16:
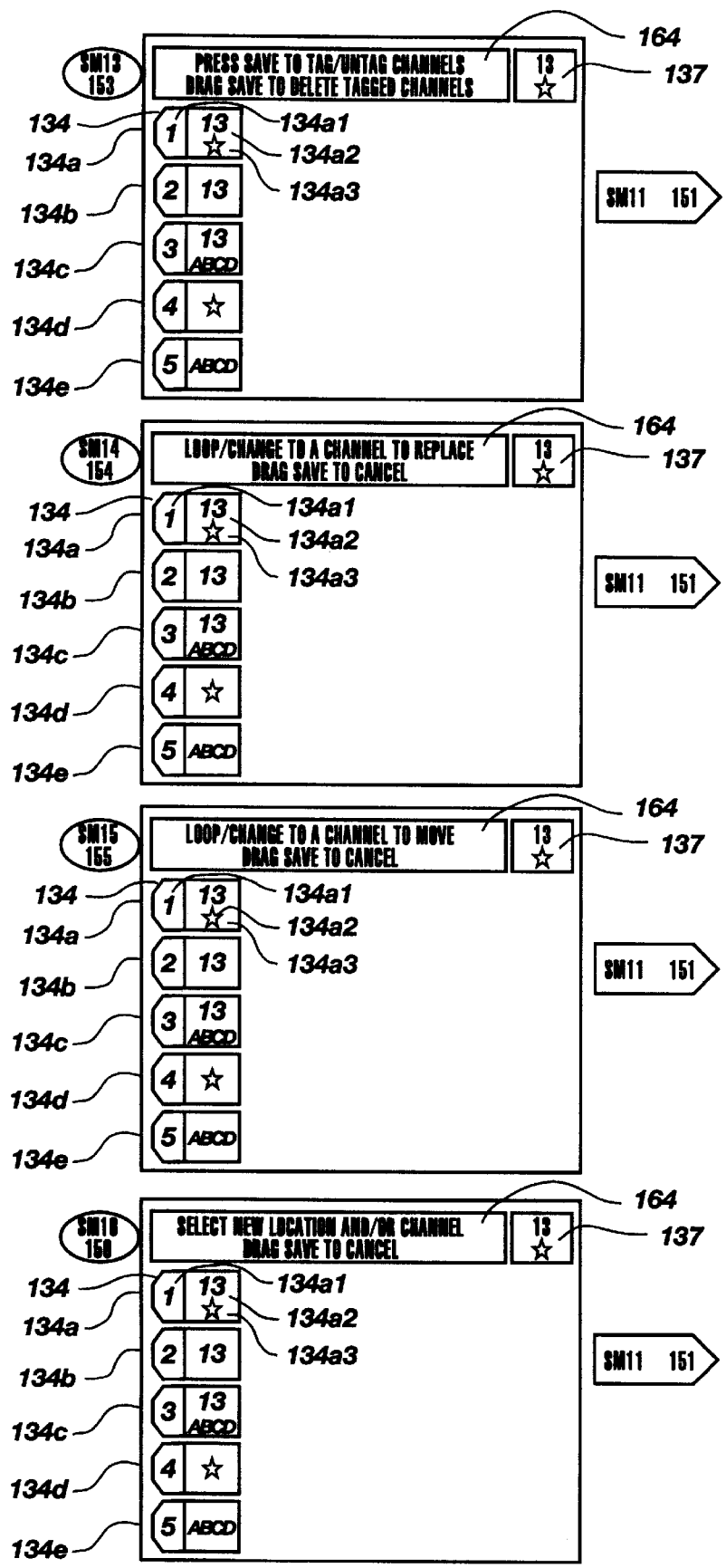

Referring to FIG. 16, screen method thirteen 153 may be a child menu of screen method eleven 151. Screen method thirteen 153 may contain an instruction bar 164, a channel display 137, and from one to five active sideboxes 134a–134e. Pressing the save button 42 on any highlighted sidebox may tag the sidebox channel 134a1 to be deleted from the channel list being edited. Pressing the save button 42 again will untag the sidebox. Pressing the loop button may loop through the sidebox display. Dragging the loop button may reverse the looping direction. Once all desired channels have been tagged, dragging the save button 42 may cause all tagged channels to be deleted. The processor 16 may then return control to screen method eleven 151.

Screen method fourteen 154 may be a child menu of screen method eleven 151. Screen method fourteen 154 may contain an instruction bar 164, a channel display 137, and from one to five active sideboxes 134a–134e. Pressing the save button 42 on any highlighted sidebox may tag the sidebox to indicate that another user selected channel is to be accessed by pressing any channel key 28, 32, 34. After a replacement channel has been selected, pressing the save button 42 may cause the selected channel to replace the channel 134a2 already existing in the tagged sidebox. Upon replacing a sidebox channel 134a2 in this manner, all active sideboxes may be highlighted to indicate that: another consecutive press of the save button 42 will save the edited channel list. Once saved in this manner, the processor 16 may return to screen method eleven 151. Tags may be cleared by pressing the loop button 40, thus indicating that the user may select another channel to be replaced. Pressing the loop button may loop through the sidebox display, dragging the loop button may reverse the looping direction.

Screen method fifteen 155 may be a child menu of screen method eleven 51. Screen method fifteen 155 may contain an instruction bar 164, a channel display 137, and from one to five active sideboxes 134a–134e. Pressing the save button 42 may tag the current sidebox to indicate that it is to be moved by pressing the loop button 40. After selecting a new location for the sidebox, pressing the save button 42 may cause the tag to be removed from the sidebox, thus completing the sidebox relocation. Upon moving a sidebox in this manner, all active sideboxes may be tagged to indicate that another consecutive press of the save button will save the edited channel list. Once saved in this manner, all active sideboxes may be tagged to indicate that another consecutive press of the save button will save the edited channel list. Once saved in this manner, the processor may return to screen method eleven 151. Tags may be cleared by pressing the loop button 40 indicating that the user may select another channel to be moved. Pressing the loop button may loop through the sidebox display. Dragging the loop button may reverse the looping direction.

Screen method sixteen 156 may be a child menu of screen method eleven 151. Screen method sixteen 156 may contain an instruction bar 164, a channel display 137, and from one to five active sideboxes 134a–134e. Screen method sixteen 156 may allow a user to add new channels to a custom list. Pressing the save button 42 may perform the same function as described in screen method zero with the following exception; pressing the save button 42 when all sideboxes are tagged may cause the processor 16 to save the changes made to the channel list being edited, and then return to screen method eleven 151. Pressing the loop button may loop through the selected channels. Dragging the loop button may reverse the looping direction.

Figure 17:
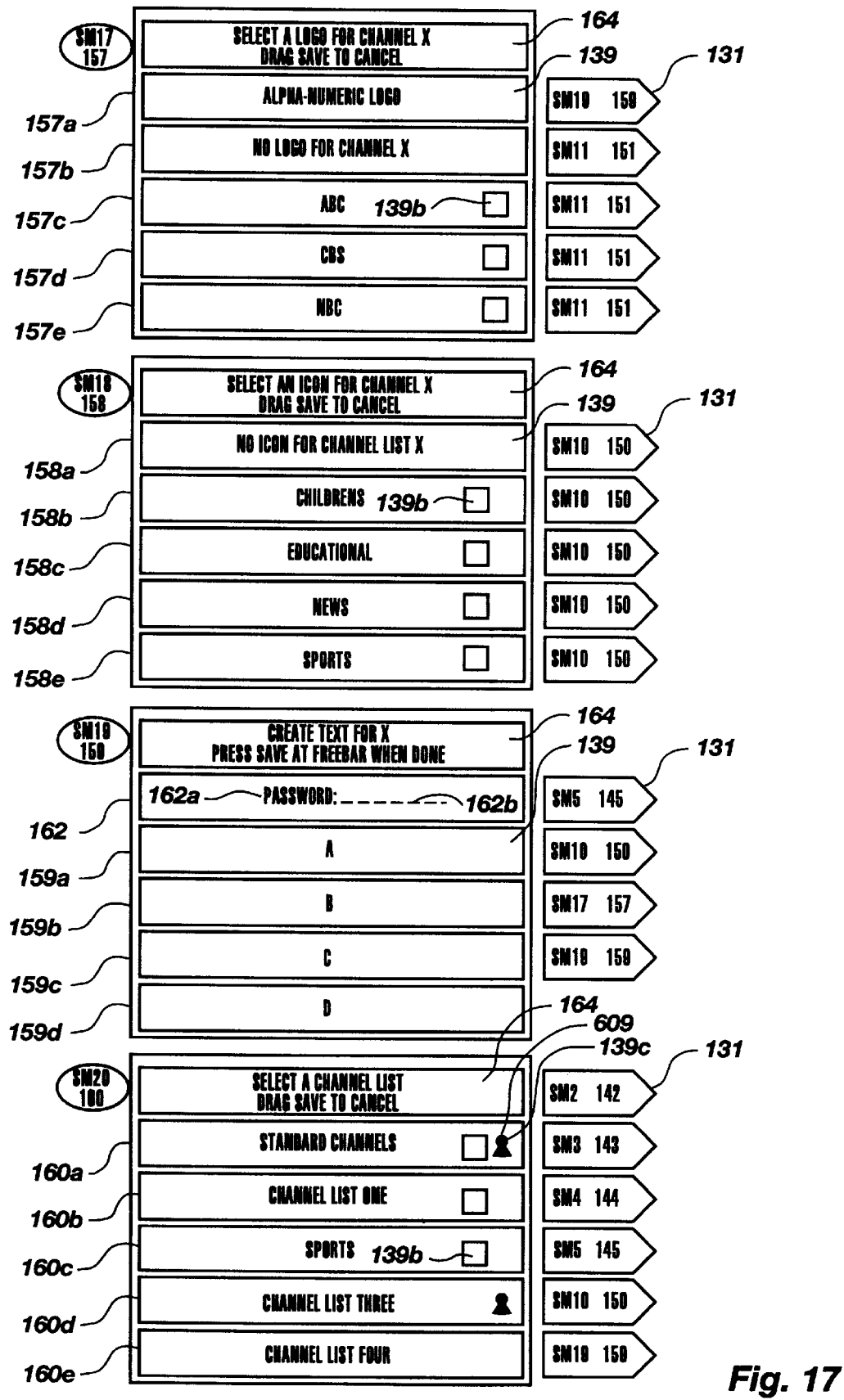

Referring to FIG. 17, screen method seventeen 157 may be a child menu to screen method eleven 151. Screen method seventeen 157 may contain an instruction bar 164, five menu bars 157a–157e, some of which may contain an icon display window 139b. Each menu bar may contain an option concerning station identification logos. Selecting menu bar 157a may provide a means to create an alphanumeric station identification logo via screen method nineteen 159. Selecting menu bar 157b may cause the station identification logo 134a3, should one exist, to be erased. Selecting menu bars 157c–e may select a corporate station identification logo displayed in the icon display window 157c2. More corporate logos may be accessed by looping. After a corporate logo is selected, the processor 16 may return to screen method eleven 151. Pressing the loop button may loop through the menu options. Dragging the loop button may reverse the looping direction.

Screen method eighteen 158 may be a child menu of screen method ten 150. Screen method eighteen 158 may contain an instruction bar 164, five menu bars 158a–158e, some of which may contain an icon display window 139b. Each menu bar may contain an option concerning descriptive icons for channel lists. Selecting menu bar 158a may cause the channel list icon, should one already exist, to be erased. Selecting menu bars 158b–e may select an icon for the channel list being edited. An icon may be displayed along side an alphanumeric channel list label in any menu bar 139. More icons may be accessed by looping. After an icon is selected, the processor 16 may return to screen method ten 150. Pressing the loop button may loop through the menu options. Dragging the loop button may reverse the looping direction.

Screen method nineteen 159 may be a child menu of screen methods two 142, three 43, five 145, eight 148, ten 150, seventeen 157, nineteen 159, and twenty 160. Screen method nineteen 159 may contain an instruction bar 164, a freebar menu bar 162 containing a freebar text display 162a and a user creatable text display 164b, and four menu bars 159a–159d. Each menu bar may contain an alphanumeric character to be used in creating text for use as passwords, channel list labels, and individual channel station identification. Selecting menu bar 159a–z may cause the alphanumeric character within to be added to the user creatable text display 162b. A freebar 162 may remain displayed to the screen 20 while menu bars 139 may loop on and off the display 20 during looping. Thus, a user may always be able to view the contents of freebar 162 while looping through letter selections. Dragging the loop button 40 while the freebar 162 is highlighted may cause the processor 16 to erase the text string 162b beginning at the last character and progressing towards the first character one at a time throughout the duration of the holding down of the loop button 40. Pressing the save button while the freebar 162 is highlighted may cause the character string 162b to be saved to as the type of text being created (i.e. passwords, channel list labels, or station identifications). Once text has been created in this manner, the processor 16 may return to screen method five 145, ten 150, seventeen 157, or nineteen 159, or in the case of a non-matching password, a parent menu. Pressing the loop button may loop through the sidebox display. Dragging the loop button may reverse the looping direction except while the freebar 162 is highlighted, in which case text may be erased.

Screen method twenty 160 may be a child menu of screen methods two 142, three 143, four 144, and five 145. Screen method twenty 160 may contain an instruction bar 164 and may contain from one to five menu bars 160a–160e. Each may contain an icon display window 139b to display icons to describe the individual channel lists, and a lock display 139c to indicate if the individual channel list is protected by a password. Selecting menu bar 160a may cause the standard channel list to undergo the function described by instruction bar 164 (i.e. edited, locked, loaded, or deleted). If a lock icon 139c is present in menu bar 160a, then access to the standard channel list will not be allowed until the user successfully enters the master password via screen method nineteen 159. Selecting menu bars 160b–e may select a channel list to undergo the function described by instruction bar 164. If a lock icon is present in menu bar 160b–e, then access to the channel list will not be allowed until the user successfully enters the user defined password via screen method nineteen 159. More channel lists may be accessed by looping. After a channel list is selected, the processor 16 may return to either screen method nine 149, or screen method nineteen 159, or in the case of a failed password entry, to the parent menu. Pressing the loop button may loop through the menu options. Dragging the loop button may reverse the looping direction. Dragging the save button 42 may cancel screen method twenty 160 and return to a parent menu.

From the above discussion, it will be appreciated that the present invention provides a sidebox display channel loop controller enabling a user to independently configure and store several different channel lists, with each channel list capable of having one or more channels stored therein. It will be apparent that the present invention reduces the time and effort expended by a user in changing the channel being viewed to a desired channel.

Moreover, the channel loop controller facilitates a user assigning a topic to a channel list and assigning an indicative graphical symbol to identify the topic.

Additionally, the present invention displays to a user an entire channel list whereby the user can easily see what channels are contained in the list displayed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for user creation and control of channel lists for a television, the apparatus comprising:

a processor operably associated with the television and effective to execute instructions to control the television;

an input device operably connected to the processor to provide real-time interactive user inputs to the processor while the user watches the television;

a non-volatile memory device operably connected to the processor for the storage of the channel lists;

a memory device operably connected to the processor to store executables to be executed by the processor, to store received inputs from a user, and to store output data corresponding to outputs displayable to a user; and an output device for displaying an image corresponding to the output data.

2. The apparatus of claim 1, wherein the input device further comprises a button to control creation of the channel lists.

\* \* \* \* \*